(12) United States Patent
Kraus et al.

(10) Patent No.: US 7,565,728 B2
(45) Date of Patent: Jul. 28, 2009

(54) METHOD FOR ADJUSTING A WIPING ANGLE

(75) Inventors: Achim Kraus, Buehl (DE); Gundolf Surkamp, Vilafranca Del Penedes (ES)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/587,563

(22) PCT Filed: Jan. 13, 2005

(86) PCT No.: PCT/EP2005/050129

§ 371 (c)(1),
(2), (4) Date: Jun. 8, 2007

(87) PCT Pub. No.: WO2005/073040

PCT Pub. Date: Aug. 11, 2005

(65) Prior Publication Data

US 2007/0215175 A1 Sep. 20, 2007

(30) Foreign Application Priority Data

Feb. 2, 2004 (DE) .................. 10 2004 005 069

(51) Int. Cl.
*B60S 1/24* (2006.01)
(52) U.S. Cl. .................. 29/428; 15/250.16; 15/250.13; 15/250.3; 15/250.31; 74/42; 74/75; 74/600; 74/571.1; 403/122
(58) Field of Classification Search .............. 15/250.3, 15/250.31, 250.16, 250.13; 29/428; 74/594, 74/42, 43, 600, 570.2, 570.21, 571.1, 571.11, 74/47, 75; 403/122

See application file for complete search history.

(56) References Cited

U.S. PATENT DOCUMENTS

| | | | |
|---|---|---|---|
| 2,753,721 A * | 7/1956 | Latta .............................. 74/75 |
| 3,588,940 A * | 6/1971 | Mainka et al. ........... 15/250.17 |
| 4,157,666 A | 6/1979 | Ursel et al. |
| 5,070,572 A * | 12/1991 | Kuhbauch ................. 15/250.13 |
| 5,619,886 A * | 4/1997 | Hoshino ....................... 74/522 |

FOREIGN PATENT DOCUMENTS

| | | | |
|---|---|---|---|
| DE | 1906440 | * | 8/1970 |
| DE | 197 46 376 | | 4/1999 |
| EP | 0 689 976 | | 1/1996 |
| EP | 1428734 | * | 6/2004 |

* cited by examiner

*Primary Examiner*—Gary K Graham
(74) *Attorney, Agent, or Firm*—Michael Best & Friedrich LLP

(57) ABSTRACT

The invention relates to a method for adjusting a wiping angle ($\phi_1$, $\phi_2$) between a park position and a reversal position (28, 30) of a wiper lever (16, 18) of a windshield wiper system for a motor vehicle with at least one wiper lever (18) whose park position or reversal position (30) runs approximately parallel to an A pillar (14) of a vehicle body, which laterally delimits a windshield (10), wherein the wiping angle ($\phi_2$) is adjusted by means of an eccentric ball pivot (60), which is arranged on a free end of a driving crank (54) and connects the same to a motor crank (52) in an articulated manner by means of an articulated rod (42), while the other end of the driving crank (54) sits on a drive shaft (56) in a rotationally fixed manner, said drive shaft driving a fastening part (58) of the wiper lever (18). It is proposed that the windshield wiper system is first mounted on the vehicle body without the eccentric ball pivot (60), that a rivet journal (64) of the eccentric ball pivot (60) is then inserted into a corresponding bore hole of the driving crank (54), that the optimum wiping angle ($\phi_2$) is determined and adjusted by modifying the effective radius (78) between an articulation axis (66) of the eccentric ball pivot (60) and an axis (76) of the drive shaft (56) by rotating the eccentric ball pivot (60) around an axis (68) of the rivet journal (64), and that finally the rivet journal (64) is fixed in the driving crank (54) in the adjusted position.

8 Claims, 2 Drawing Sheets

METHOD FOR ADJUSTING A WIPING ANGLE

BACKGROUND OF THE INVENTION

The invention relates to a method for adjusting a wiping angle.

What is demanded of today's windshield wiper systems is that they possess the largest possible wiper field that covers the entire windshield as much as possible. This is achieved in that at least one wiper lever of the windshield wiper system has a park position or a reversal position in the vicinity of the lateral delimitation and that it runs approximately parallel to it. The lateral delimitations of the windshield are formed by so-called A pillars of the vehicle body. Most of the time, the wiper lever fulfills these conditions on the driver's side of the motor vehicle.

Furthermore, longer and longer wiper levers are being used with longer and longer wiper blades. Because of the wiping angle tolerances, this produces very great distances to the A pillar at the reversal position of the wiper lever. In the case of a wiper field definition for a wiper lever with a length of approx. 1000 millimeters and a standard wiping angle tolerance of ±1.5 degrees, this means that, in the most unfavorable case, an unwiped area that is 52 millimeters wide in the area of the A pillar will need to be taken into consideration. This leads to problems in terms of today's visual field requirements.

In the case of windshield wiper systems that are common nowadays, the wiper lever sits with a fastening part on a drive shaft. This is driven by a wiper motor via a driving crank and a ball pivot as well as via a lever mechanism. In addition, in the case of known windshield wiper systems, the ball pivot is embodied as an eccentric ball pivot and mounted on the driving crank. The wiping angle is then measured at the end of the production line. By rotating the eccentric, the effective radius of the driving crank is modified until the wiping angle achieves the required value. Finally, the eccentric ball pivot is secured using a counternut.

SUMMARY OF THE INVENTION

According to the invention, the windshield wiper system is first mounted on the vehicle body without the eccentric ball pivot. A rivet journal of the eccentric ball pivot is then inserted into a corresponding bore hole of the driving crank and adjusted in accordance with the optimal wiping angle by modifying the effective radius between the articulation axis of the eccentric ball pivot and an axis of the drive shaft by rotating the eccentric ball pivot around an axis of the rivet journal. Finally, the rivet journal is fixed in the driving crank. Because of the method in accordance with the invention, not only are the tolerances of the individual parts of the windshield wiper system taken into consideration, but also the tolerances caused by the motor vehicle. As a result, it is possible to achieve wiping angle tolerances of ±0.5 degrees.

It is proposed in accordance with an embodiment of the invention that, after the wiping angle is adjusted, the rivet journal of the eccentric ball pivot is stamped, caulked or riveted into the driving crank. As a result, the part becomes simpler and the adjusting nut is eliminated, which is more cost effective as a whole.

Moreover, the possibility exists that the effective radius, with which the eccentric ball pivot is adjusted by means of an adjusting and caulking device, is determined in a trial or control loop on the basis of the tolerance position of the wiping angle of the wiper system already installed in like motor vehicles and the tolerance position of individual parts of the windshield wiper system. These experimental values allow sufficiently precise conclusions to be drawn about concrete installation cases so that a very low wiping angle tolerance can also be adhered to by using this measure.

BRIEF DESCRIPTION OF THE DRAWINGS

Additional advantages are yielded from the following description of the drawings. An exemplary embodiment of the invention is depicted in the drawings. The drawings, the description and the claims contain numerous features in combination. The person skilled in the art will also observe individual features expediently and combine them into additional, meaningful combinations.

The drawings show.

DETAILED DESCRIPTION

Figure 1:
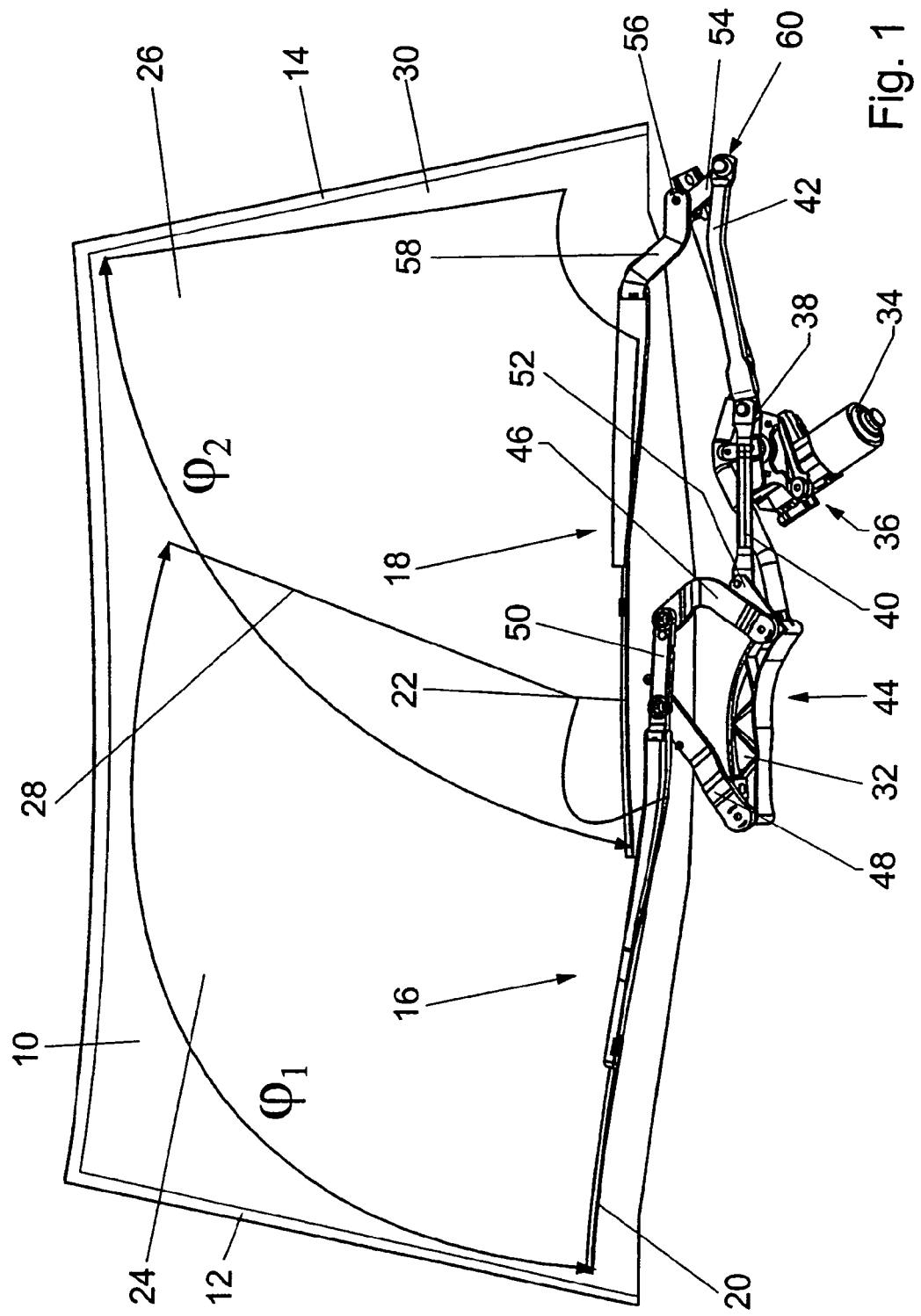
FIG. 1 A schematic structure of windshield wiper system.

As needed, a windshield wiper system cleans a windshield 10, which is delimited laterally by two so-called A pillars 12, 14. The system has two wiper levers 16, 18 whose wiper blades 20, 22 travel over the wiper fields 24, 26 on the windshield 10. In the depiction in FIG. 1, the wiper levers 16, 18 assume a park position in the vicinity of the lower edge of the windshield 10. During the wiping movement, they travel a wiping angle $\phi_1$, $\phi_2$, which extends between the depicted park position and a reversal position 28, 30 of the wiper lever 16, 18.

The wiper levers 16, 18 are driven by a wiper motor 34 via a gear 36, a motor crank 38 and a lever mechanism. The parts of the drive are mounted on a mounting plate 32, which is fastened to the vehicle body. The lever mechanism for the wiper lever 16 on the passenger side of the vehicle is comprised of an articulated rod 40 and a driving crank 52, which drive a drive lever 46 of a four-bar lever mechanism 44. Also a part of this is a connecting rod 48 and a coupling element 50, which is connected to the wiper lever 16. As a result of the four-bar lever mechanism 44, a lifting movement is superimposed on the rotating movement of the wiper lever 16 so that the wiper field 24 extends relatively far into the upper corner of the windshield 10 on the passenger side.

The lever mechanism for the wiper lever 18 on the driver's side includes an articulated rod 42, which is coupled to a driving crank 54 via an eccentric ball pivot 60. This sits in a rotationally fixed manner on a drive shaft 56, which is pivoted in a bearing housing (not shown) and sits on the one fastening part 58 of the wiper lever 18. The reversal position 30 of the wiper lever 18 is near the associated A pillar 14 of the vehicle body and runs approximately parallel to it. The wiping angle $\phi_2$ is adjusted so that the unwiped surface between the wiper field 26 and the A pillar 14 is not too large, but the wiper blade also does not hit the A pillar 14. To do so, the windshield wiper system is first mounted on the motor vehicle without the eccentric ball pivot 60 and then the effective radius 78 (FIG. 2) between an articulation axis 66 of the ball pivot 62 and the axis 76 of the drive shaft 56 is modified in such a way until the optimum wiping angle $\phi_2$ is achieved. For this purpose, the rivet journal 64, whose axis 68 is offset radially by an eccentricity 70 and runs parallel to the articulation axis 66, is rotated around the journal axis 68. Once the correct adjustment has been found, the rivet journal 64 is fixed relative to the driving crank 54 by being expediently stamped, caulked or riveted to it. In doing so, the ball pivot 62 abuts the driving crank 54 with a bearing collar 74. The articulation rod 42 is coupled to the ball pivot 62, wherein the ball center 72 is simultaneously the center of the articulation.

Figure 2:
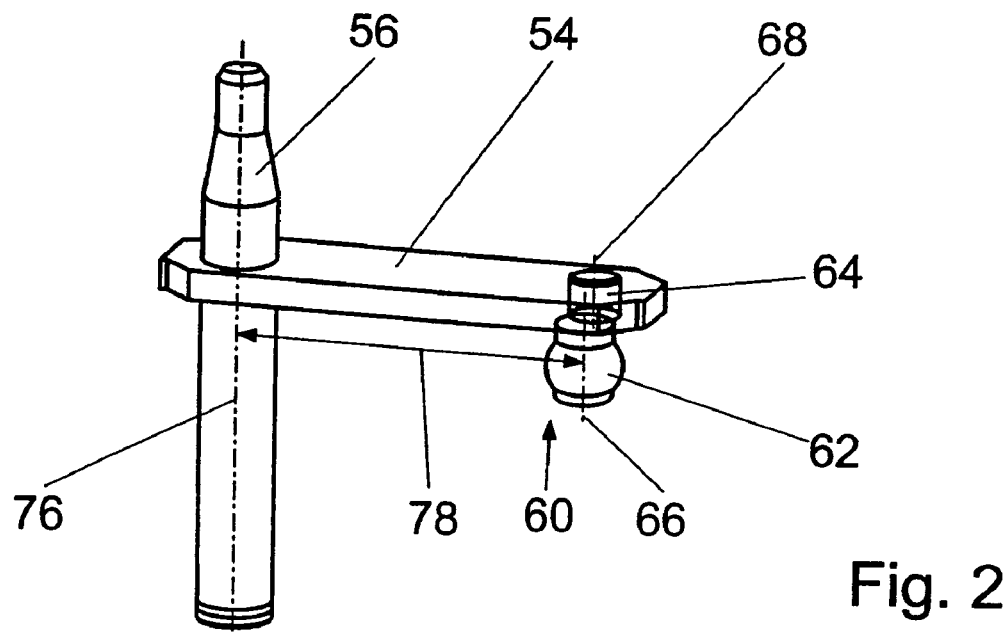
FIG. 2 A drive shaft with a driving crank and an eccentric ball pivot.
Figure 3:
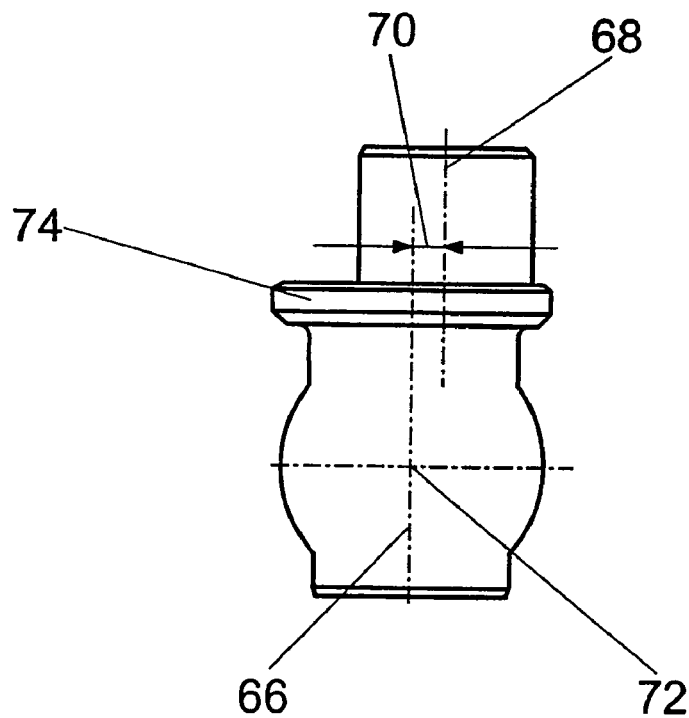
FIG. 3 An enlarged scale of an eccentric ball pivot.

In FIG. 2 the eccentric ball pivot 60 is directed toward the inside of the motor vehicle. Alternatively, it can also point to the outside. In just the same way, the crank 54, which is arranged in FIG. 2 in the area of the outer end of the drive shaft 56, can be provided on the inner end of the drive shaft 56 as an alternative.

The invention claimed is:

1. Method for adjusting a wiping angle ($\phi_1$, $\phi_2$) between a park position and a reversal position (28, 30) of a wiper lever (16, 18) of a windshield wiper system for a motor vehicle with at least one wiper lever (18) whose park position or reversal position (30) runs approximately parallel to an A pillar (14) of a vehicle body, which laterally delimits a windshield (10), wherein the wiping angle ($\phi_2$) is adjusted by means of an eccentric ball pivot (60), which is arranged on a free end of a driving crank (54) and connects the same to a motor crank (52) in an articulated manner by means of an articulated rod (42), while the other end of the driving crank (54) sits on a drive shaft (56) in a rotationally fixed manner, said drive shaft driving a fastening part (58) of the wiper lever (18), characterized in that the windshield wiper system is first mounted on the vehicle body without the eccentric ball pivot (60), that a rivet journal (64) of the eccentric ball pivot (60) is then axially inserted fully into a corresponding bore hole of the driving crank (54), that, with the rivet journal (64) of the eccentric ball pivot (60) fully axially inserted in the corresponding bore hole, the optimum wiping angle ($\phi_2$) is determined and adjusted by modifying the effective radius (78) between an articulation axis (66) of the eccentric ball pivot (60) and an axis (76) of the drive shaft (56) by rotating the eccentric ball pivot (60) around an axis (68) of the rivet journal (64), and that finally the rivet journal (64) is non-adjustably fixed in the driving crank (54) in an adjusted position to non-adjustably fix the wiping angle of the wiper lever.

2. Method according to claim 1, characterized in that, after the wiping angle ($\phi_2$) is adjusted, the rivet journal (64) of the eccentric ball pivot (60) is stamped, caulked or riveted into the driving crank (54).

3. Method according to claim 2, characterized in that the effective radius (78) with which the eccentric ball pivot (60) is adjusted is determined on the basis of tolerance positions of the wiping angle ($\phi_2$) of wiper systems already installed in like motor vehicles and a tolerance position of individual parts of the wiper system.

4. Method according to claim 1, characterized in that the effective radius (78), with which the eccentric ball pivot (60) is adjusted is determined on the basis of tolerance positions of the wiping angle ($\phi_2$) of wiper systems already installed in like motor vehicles and a tolerance position of individual parts of the wiper system.

5. Method according to claim 1, characterized in that, after the wiping angle ($\phi_2$) is adjusted, the rivet journal (64) of the eccentric ball pivot (60) is stamped into the driving crank (54).

6. Method according to claim 1, characterized in that, after the wiping angle ($\phi_2$) is adjusted, the rivet journal (64) of the eccentric ball pivot (60) is caulked into the driving crank (54).

7. Method according to claim 1, characterized in that, after the wiping angle ($\phi_2$) is adjusted, the rivet journal (64) of the eccentric ball pivot (60) is riveted into the driving crank (54).

8. Method for adjusting a wiping angle ($\phi_1$, $\phi_2$) between a park position and a reversal position (28, 30) of a wiper lever (16, 18) of a windshield wiper system for a motor vehicle with at least one wiper lever (18) whose park position or reversal position (30) runs approximately parallel to an A pillar (14) of a vehicle body, which laterally delimits a windshield (10), wherein the wiping angle ($\phi_2$) is adjusted by means of an eccentric ball pivot (60), which is arranged on a free end of a driving crank (54) and connects the same to a motor crank (52) in an articulated manner by means of an articulated rod (42), while the other end of the driving crank (54) sits on a drive shaft (56) in a rotationally fixed manner, the drive shaft driving a fastening part (58) of the wiper lever (18), the method comprising:

mounting the windshield wiper system on the vehicle body without the eccentric ball pivot (60);

after mounting, axially inserting a rivet journal (64) of the eccentric ball pivot (60) into a corresponding bore hole of the driving crank (54), the rivet journal being fully axially inserted into the bore hole;

with the rivet journal (64) of the eccentric ball pivot (60) fully axially inserted in the corresponding bore hole, determining and adjusting the optimum wiping angle ($\phi_2$) by modifying the effective radius (78) between an articulation axis (66) of the eccentric ball pivot (60) and an axis (76) of the drive shaft (56) by rotating the eccentric ball pivot (60) around an axis (68) of the rivet journal (64); and after adjusting to the optimum wiping angle ($\phi_2$), non-adjustably fixing the rivet journal (64) in the driving crank (54) in an adjusted position to non-adjustably fix the wiping angle of the wiper lever.

\* \* \* \* \*